June 18, 1929.  M. W. P. McNAMARA  1,717,727

FISH PLATE

Original Filed May 25, 1928

Witnesses:
K. W. Fischer
F. C. Appleton

Inventor.
Michael W. P. McNamara
By Joshua R H Polk
His Attorney.

Patented June 18, 1929.

1,717,727

UNITED STATES PATENT OFFICE.

MICHAEL W. P. McNAMARA, OF CHICAGO, ILLINOIS.

FISHPLATE.

Original application filed May 25, 1928, Serial No. 280,412. Patent No. 1,700,507, dated January 29, 1929. Divided and this application filed September 24, 1928. Serial No. 307,869.

This invention relates to improvements in means for joining and connecting rails, and has for its object the provision of a device of the character described, whereby a more effective joining of rails may be obtained.

A further object of the invention is to provide an improved fish plate connection between rails such as are used in railroad and similar construction, in conjunction with means for permitting the usual expansion and contraction to which these members are subjected, due to changes in atmospheric temperature.

The present application constitutes a division of the application resulting in patent to applicant No. 1,700,507, dated January 29, 1929, entitled "Fish plates" on an application 280,412, filed May 25, 1928.

Other objects and advantages of the invention will appear more fully in the hereinafter specification when taken in connection with the accompanying drawings in which, Fig. 1 is a side elevation of the invention applied to the meeting ends of two railroad rails;

Figure 1:
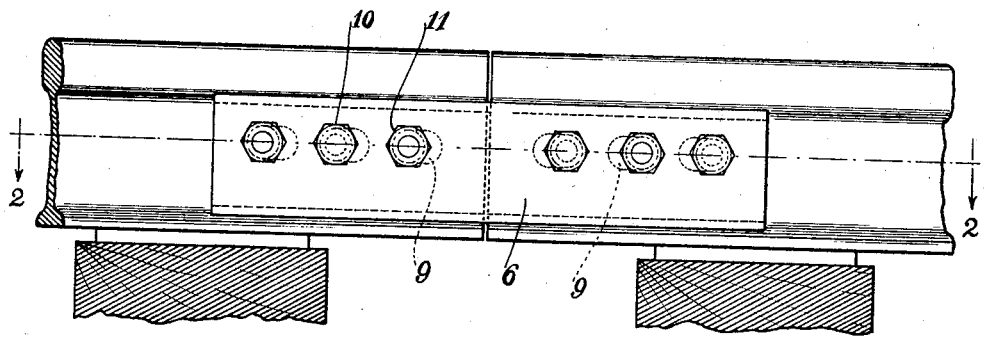
Figure 2:
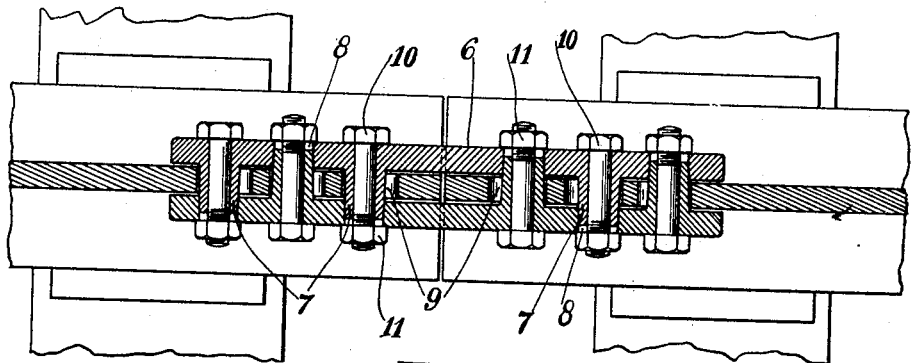
Fig. 2 is a horizontal sectional view taken on the line 2—2 of Fig. 1.
Figure 3:
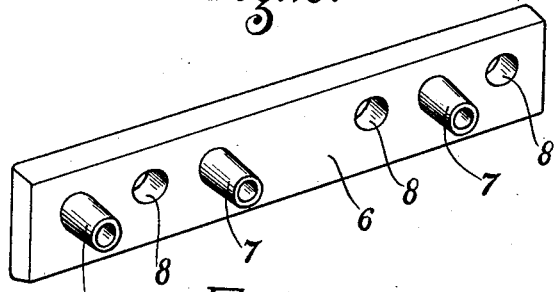
Fig. 3 is a perspective view of the preferred form of fish plate embodying the present invention, in which the male and female members are combined in one unit adapted to coact with a corresponding member.

Referring more particularly to the drawings illustrating the preferred embodiment of the invention, a fish plate member 6 is provided with latterly extending perforated bosses 7, and is also provided with apertures 8. In the construction shown the bosses and apertures are adapted to register with corresponding bosses and apertures on a companion fish plate upon application to the webs of two abutting rail ends as shown in Figs. 1 and 2. Thus it will be seen that the fish plates may be identical in structure and that in application one is reversed in position relative to the other. In this way it is unnecessary to provide the plates in pairs which is of considerable advantage from manufacturing and installation standpoints, and at the same time the stresses exerted are evenly absorbed by the plates because of their similar construction and the provision of bosses and boss receiving apertures upon each plate.

The web of each rail end is provided with longitudinally elongated apertures 9 which are adapted to register with the bosses and apertures upon the fish plates as shown, and the purpose in making the apertures 9 of greater length than the diameter of the bosses 7, as indicated in the drawings, is to allow for relative movement between the rail ends and the fish plates necessitated by the normal expansion and contraction due to temperature changes. Upon application of the plates to the respective sides of the rail webs as shown, the assembly is secured by bolts 10 which extend through the perforated bosses 7 and upon which are screw-threaded nuts 11 whereby the combination male and female fish plates and consequently the rails are rigidly secured, at the same time having provision for such expansion or contraction as may occur.

The novel type of fish plate effectuates a more rigid conjunction of rails as ordinarily used in street car or railroad service. The bosses are preferably slightly tapered in order to obtain a wedging effect at the point of application to the rail. As is obvious from an inspection of the plates, their application is a simple operation and requires no more time or skill than in applying fish plates of the conventional type.

While I have illustrated and described the preferred form of construction for carrying my invention into effect, this is capable of variation and modification without departing from the spirit of the invention. I, therefore, do not wish to be limited to the precise construction as set forth, but desire to avail myself of such variations and modifications as come within the scope of the appended claims.

Having thus described my invention, what I claim as new and desire to secure by Letters Patent is:

1. The combination with abutting rail ends of a combined male and female fish plate, having a plurality of bolt receiving tapered bosses and a plurality of perforations; said bosses and perforations being adapted to register in a wedging manner with perforations and bosses on a similar plate, and means for permitting relative movement between said rail ends and said fish plate members to allow for expansion and contraction.

2. The combination with abutting rail ends of a combined male and female fish plate, having a plurality of bolt receiving tapered bosses and a plurality of perforations; said bosses and perforations being adapted to register in a wedging manner with perforations and bosses on a similar plate; and elongated apertures in the webs of said rail ends adapted to receive said bosses and permit relative movement between said rails and said fish plate members due to expansion and contraction.

In testimony whereof I have signed my name to this specification.

MICHAEL W. P. McNAMARA.